US012196865B2

(12) United States Patent
Cookman et al.

(10) Patent No.: US 12,196,865 B2
(45) Date of Patent: Jan. 14, 2025

(54) QUALIFIED JAMMING SIGNAL DETECTION

(71) Applicant: QUALCOMM Incorporated, San Diego, CA (US)

(72) Inventors: Jordan Cookman, San Jose, CA (US); Krishnaranjan Rao, Sunnyvale, CA (US); Jeffrey Wong, Saratoga, CA (US); Shikha Jain, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/732,061

(22) Filed: Apr. 28, 2022

(65) Prior Publication Data
US 2023/0353272 A1 Nov. 2, 2023

(51) Int. Cl.
| G01S 19/21 | (2010.01) |
| H04K 3/00 | (2006.01) |
| G01S 19/10 | (2010.01) |
| G01S 19/25 | (2010.01) |

(52) U.S. Cl.
CPC ............ G01S 19/21 (2013.01); H04K 3/90 (2013.01); *G01S 19/10* (2013.01); *G01S 19/256* (2013.01); *H04K 3/22* (2013.01)

(58) Field of Classification Search
CPC ........ G01S 19/10; G01S 19/21; G01S 19/256; G01S 19/42; H04K 3/224; H04K 3/90; H04K 3/22
USPC ..................... 342/357.59; 455/63.1
See application file for complete search history.

(56) References Cited

U.S. PATENT DOCUMENTS

| 6,448,925 B1* | 9/2002 | Shridhara | G01S 5/011 |
| | | | 342/357.77 |
| 8,253,624 B2* | 8/2012 | King | H04K 3/90 |
| | | | 342/357.77 |
| 8,718,587 B2* | 5/2014 | Wang | H03F 1/565 |
| | | | 455/278.1 |
| 11,233,597 B2* | 1/2022 | Agarwal | H04B 17/345 |
| 11,463,843 B2* | 10/2022 | Cookman | H04W 72/0453 |
| 11,764,894 B2* | 9/2023 | Cookman | H04B 17/318 |
| | | | 455/1 |

(Continued)

FOREIGN PATENT DOCUMENTS

| EP | 2846174 A1 | 3/2015 |
| EP | 2908454 A2 | 8/2015 |

OTHER PUBLICATIONS

International Search Report and Written Opinion—PCT/US2023/017841—ISA/EPO—Jul. 14, 2023.

*Primary Examiner* — Chuong P Nguyen
(74) *Attorney, Agent, or Firm* — QUALCOMM Incorporated

(57) ABSTRACT

A jamming signal detection control method includes: receiving, at a satellite positioning signal receiver, one or more satellite positioning signals; determining, at the satellite positioning signal receiver, one or more quality metric values based on the one or more satellite positioning signals; determining, at the satellite positioning signal receiver, whether the one or more quality metric values are indicative of jamming; and activating, at the satellite positioning signal receiver and in response to the one or more quality metric values being indicative of jamming, a jammer detection technique to determine whether a jamming signal is received by the satellite positioning signal receiver.

26 Claims, 8 Drawing Sheets

(56) References Cited

U.S. PATENT DOCUMENTS

| | | |
|---|---|---|
| 2012/0170754 A1 | 7/2012 | Girard et al. |
| 2014/0349568 A1* | 11/2014 | Niemela .................. H04K 3/22 |
| | | 455/1 |
| 2021/0067265 A1* | 3/2021 | Agarwal ................ H04K 3/224 |
| 2021/0266091 A1 | 8/2021 | Azoulai et al. |
| 2023/0035711 A1* | 2/2023 | Zheng .................... G01S 5/011 |
| 2023/0254833 A1* | 8/2023 | Baracca .................. H04K 3/22 |
| | | 370/329 |

\* cited by examiner

QUALIFIED JAMMING SIGNAL DETECTION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Signals received by mobile devices, e.g., 5G signals, satellite vehicle signals, etc., may be jammed, degrading the usefulness of the received signals. Signals may be intentionally jammed, e.g., by an entity desiring to inhibit communications and/or or accurate positioning of mobile devices, and/or unintentionally jammed, e.g., by a signal repeater that retransmits a signal at a much higher power than the signal is received by the repeater and other devices in the area, or by a transmission by the mobile device that receives the signal, with the transmission inducing in-band or out-of-band jamming.

SUMMARY

An example apparatus includes: a receiver configured to receive satellite positioning signals; a memory; and a processor, communicatively coupled to the receiver and the memory, configured to: determine one or more quality metric values based on one or more of the satellite positioning signals; determine whether the one or more quality metric values are indicative of jamming; and activate, in response to the one or more quality metric values being indicative of jamming, a jammer detection technique to determine whether a jamming signal is received by the receiver.

An example jamming signal detection control method includes: receiving, at a satellite positioning signal receiver, one or more satellite positioning signals; determining, at the satellite positioning signal receiver, one or more quality metric values based on the one or more satellite positioning signals; determining, at the satellite positioning signal receiver, whether the one or more quality metric values are indicative of jamming; and activating, at the satellite positioning signal receiver and in response to the one or more quality metric values being indicative of jamming, a jammer detection technique to determine whether a jamming signal is received by the satellite positioning signal receiver.

Another example apparatus includes: means for receiving one or more satellite positioning signals; means for determining one or more quality metric values based on the one or more satellite positioning signals; means for determining whether the one or more quality metric values are indicative of jamming; and means for activating, in response to the one or more quality metric values being indicative of jamming, jammer detection means for determining whether a jamming signal is received by the apparatus.

An example non-transitory, processor-readable storage medium includes processor-readable instructions to cause a processor of an apparatus to: receive one or more satellite positioning signals; determine one or more quality metric values based on the one or more satellite positioning signals; determine whether the one or more quality metric values are indicative of jamming; and activate, in response to the one or more quality metric values being indicative of jamming, a jammer detection technique to determine whether a jamming signal is received by the apparatus.

DETAILED DESCRIPTION

Figure 1:
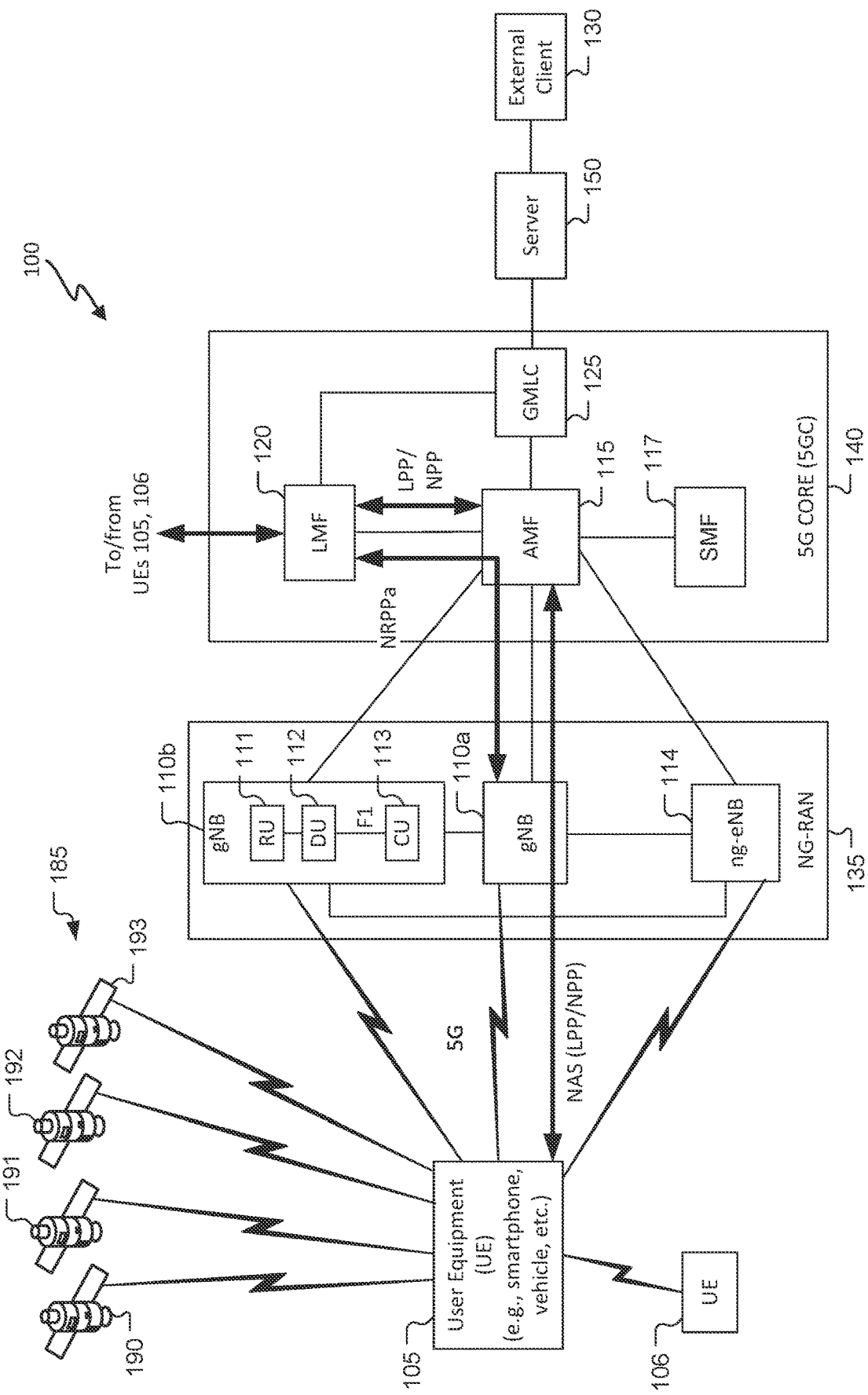
FIG. 1 is a simplified diagram of an example wireless communications system.

Techniques are discussed herein for selective enablement of jamming signal detection. For example, one or more quality metrics corresponding to position information may be used to determine to activate jamming detection. The position information may comprise one or more satellite positioning signal measurements and/or one or more values (e.g., range(s), location estimate(s), etc.) based on one or more satellite positioning signal measurements. Based on the position information, if one or more of the quality metrics is indicative of jamming, then jamming detection may be activated. If the jamming detection determines that jamming is occurring, then jamming mitigation may be implemented. Jamming detection may be deactivated in order to reduce power consumption. Jamming detection may be deactivated based on, for example, the one or more quality metrics being satisfactory, a jamming detection time passing, all jamming detection techniques available being performed, and/or a jamming signal being detected. These techniques are examples, and other techniques may be implemented.

Items and/or techniques described herein may provide one or more of the following capabilities, as well as other capabilities not mentioned. Power can be saved in satellite positioning system receivers by selectively activating jamming detection, e.g., based on likelihood of presence of one or more jamming signals and/or based on present vulnerability of a satellite positioning system receiver to jamming. Power can be saved in satellite positioning system receivers by deactivating jamming detection based on, e.g., absence of detected jamming signals, high-quality of satellite signal measurements and/or processed measurements (e.g., location estimates, ranges, etc.). Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a. 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth®(BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies.

The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC). Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signals) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM. WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
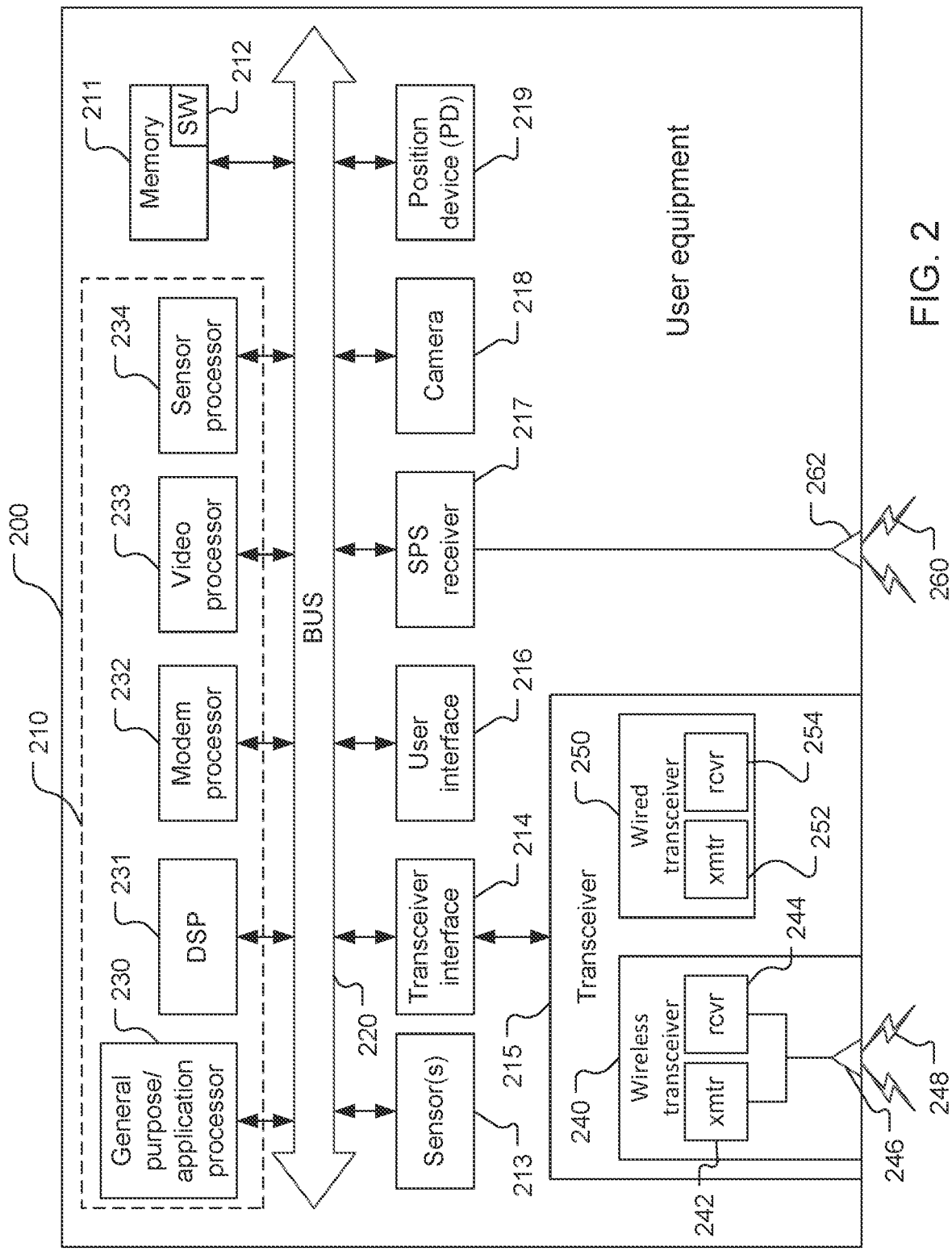
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise. e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured. e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure. e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/ application processor 230, the transceiver 215, the SPS receiver 217, and/or another component of the UE 200, and may be provided by hardware, software, firmware, or various combinations thereof.

Figure 3:
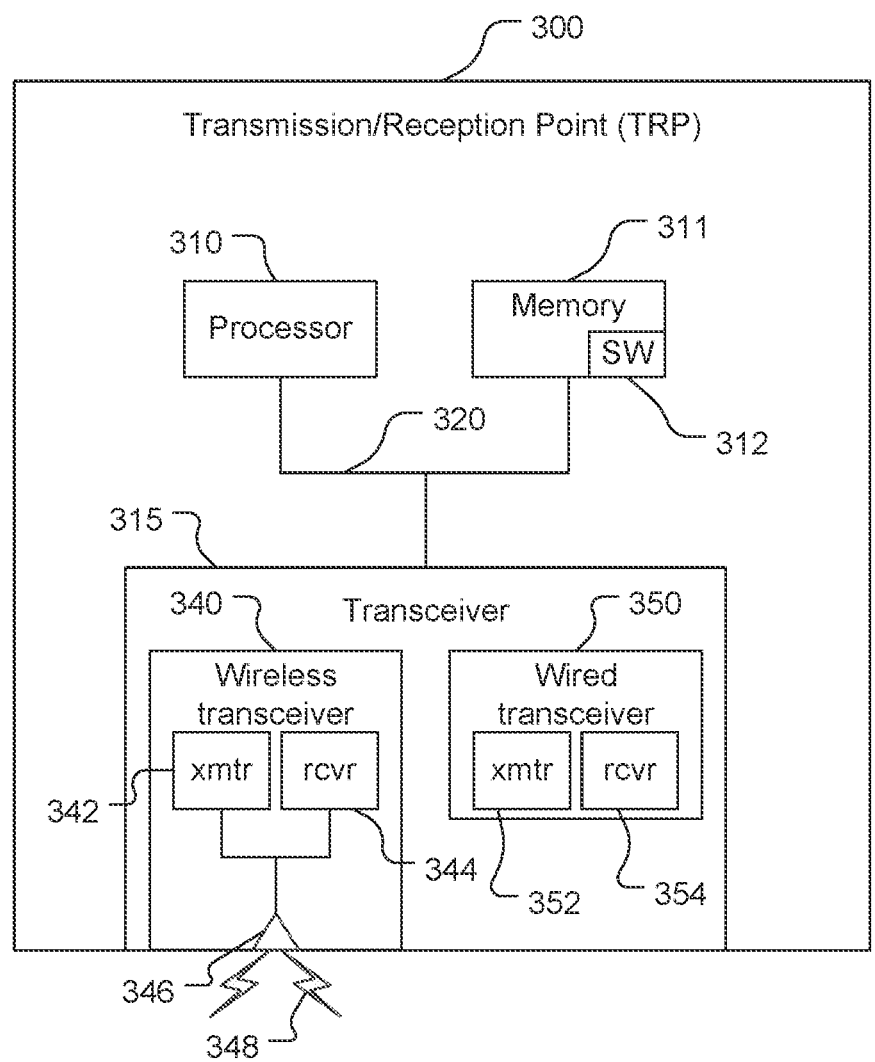
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/ integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
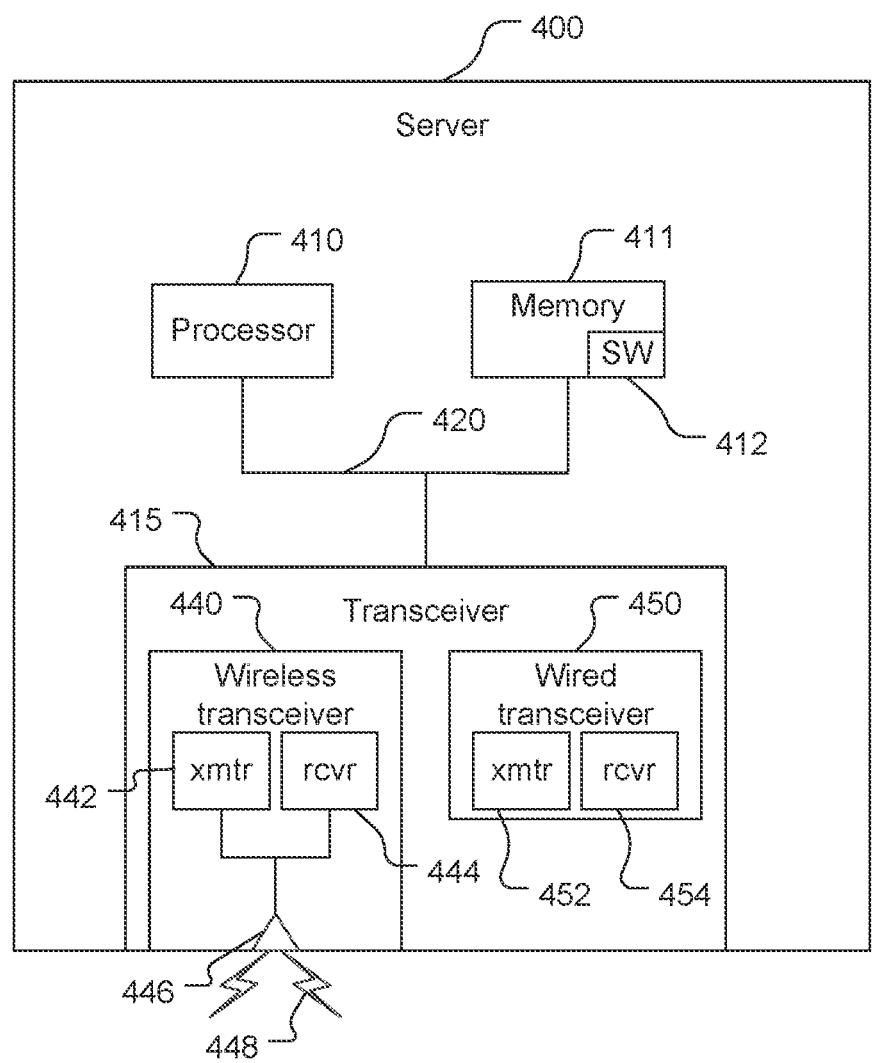
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Signal Jamming Detection Activation and Deactivation, and Jamming Mitigation

A UE may receive various types of signals, any one of which may be subject to intentional and/or unintentional jamming. A first signal (e.g., a positioning signal (satellite based or terrestrial based), a communication signal, etc.) is jammed by a second signal if the second signal interferes with measurement (e.g., impedes accurate measurement, e.g., for timing, decoding, etc.) of the first signal because the second signal is of enough power relative to the first signal when received to make measurement of the first signal unreliable. Determination that a received signal is likely to be a jamming signal may facilitate mitigation of effects of the jamming signal, e.g., trigger one or more actions to avoid using a jammed signal for positioning, for communication, etc. Determining whether a signal is a jamming signal may be determined by implementing a jamming detection technique. Jamming detection uses power of a receiver. By determining whether jamming may be present before implementing jamming detection may save power compared to having jamming detection enabled constantly. An SPS receiver may comprise a UE, or a portion of a UE. e.g., the SPS receiver 217 of the UE 200.

Figure 5:
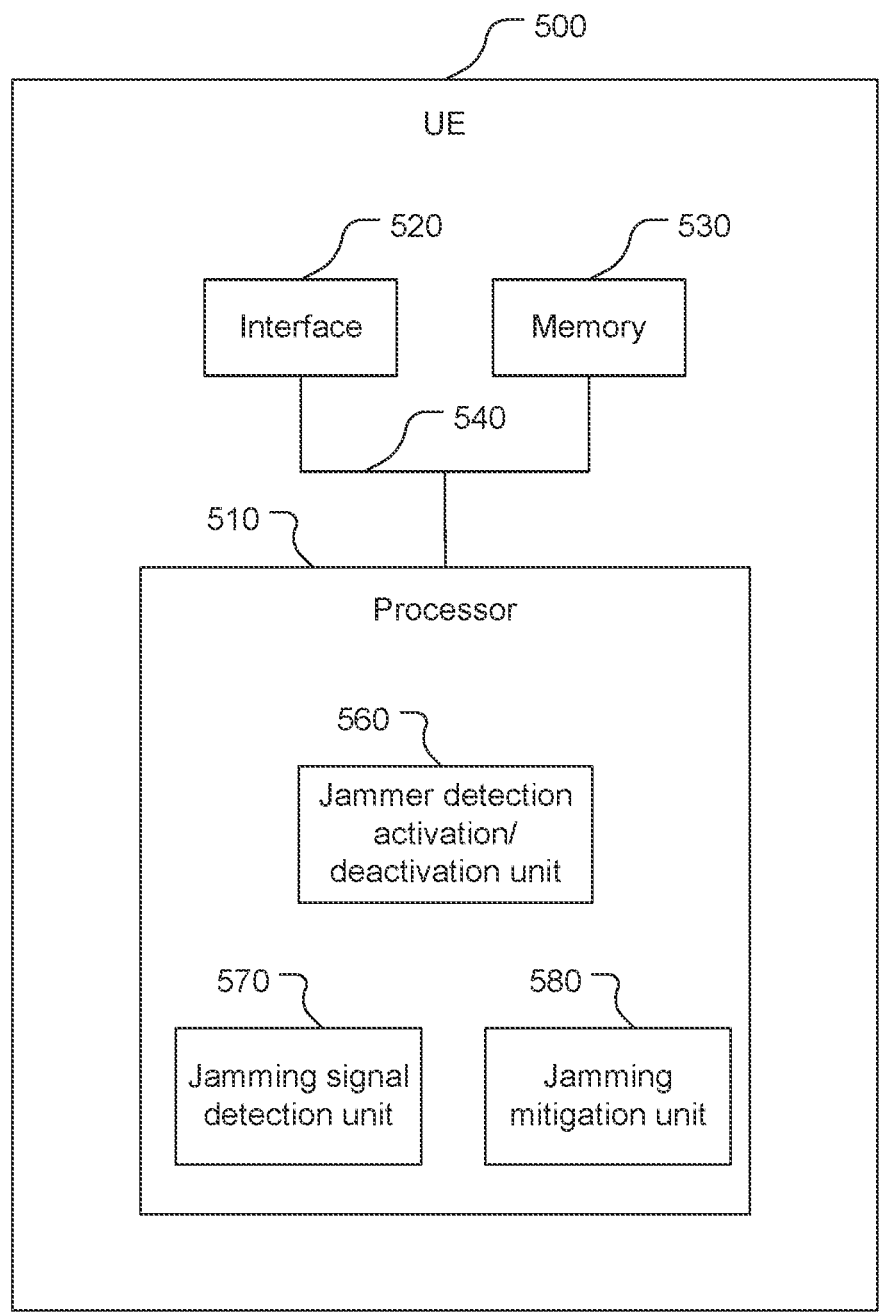
FIG. 5 is a block diagram of an example user equipment.
Figure 6:
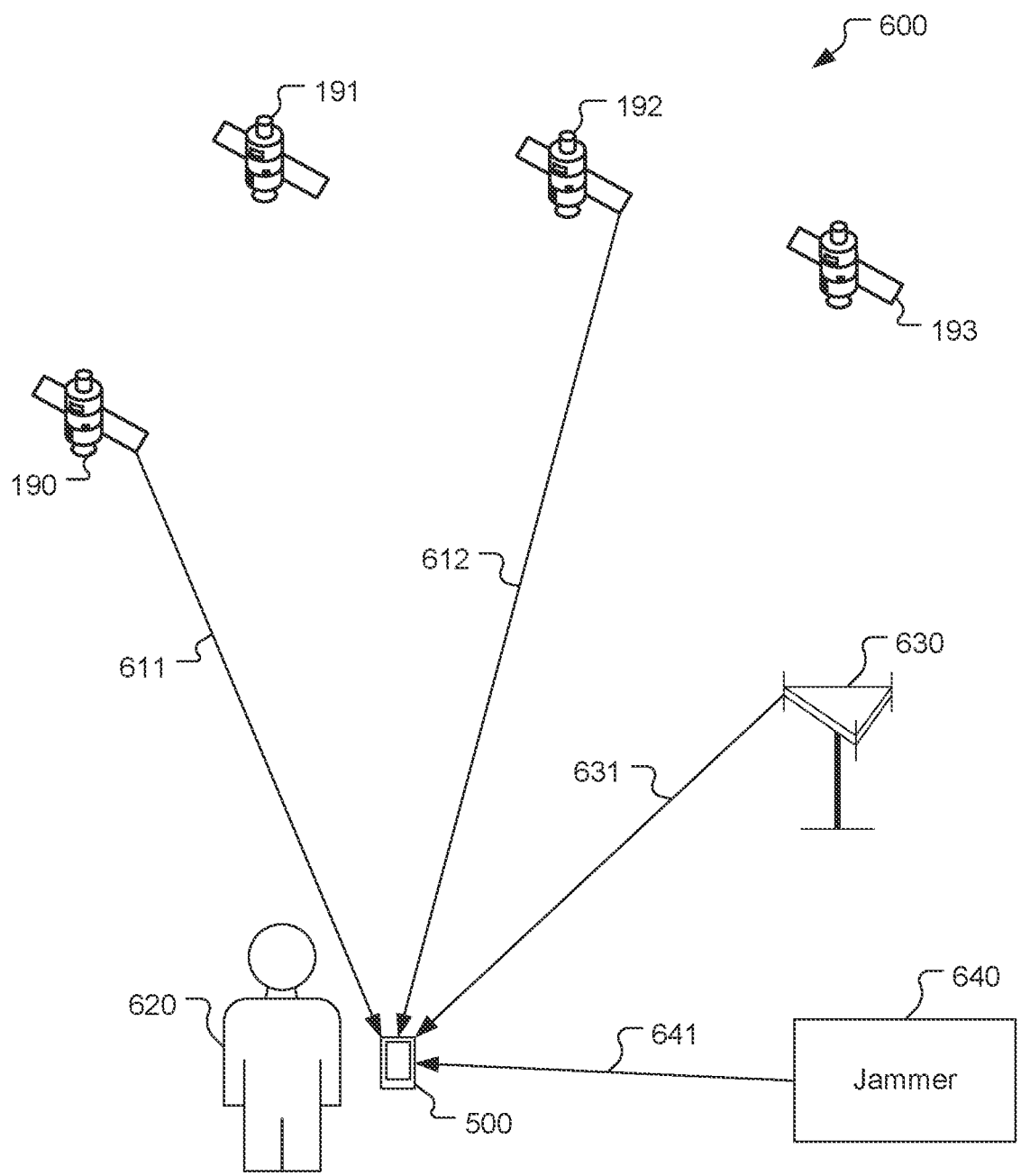
FIG. 6. is a simplified diagram of a navigation environment.

Referring to FIGS. 5 and 6, in a navigation environment 600, a UE 500 may be associated with (e.g., held by) a user 620 and may receive satellite signals 611, 612 from the satellites 190, 192, may receive a communication signal 631 from a base station 630, and may receive one or more other signals from one or more other sources, e.g., the satellites 191, 193, one or more other base stations, one or more other UEs, etc. The UE 500 also receives a jamming signal 641 from a jammer 640. The jammer 640 may produce the jamming signal 641 to intentionally jam one or more of the signals 611, 612, 631 or the jamming signal 641 may unintentionally jam one or more of the signals 611, 612, 631. For example, it has been found that terrestrial-based satellite signal repeaters may unintentionally jam satellite signals received by UEs. As another example, the jamming signal 641 may be a white noise signal, an intentional jamming signal, etc.

Referring in particular to FIG. 5, with further reference to FIGS. 1-4, the UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215. e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a jammer detection A/D unit 560 (jammer detection activation/deactivation unit), a jamming signal detection unit 570, and a jamming mitigation unit 580. The jammer detection A/D unit 560 is configured to determine whether to activate or deactivate a jammer detection technique for jamming signal detection, and to activate or deactivate the jammer detection technique as appropriate. The jammer detection technique may include one or more jamming signal detection techniques for determine whether one or more jamming signals is(are) present. The jamming signal detection unit 570 is configured to determine whether a received signal is a jamming signal, e.g., by determining whether the received signal is unacceptably unstable. The jamming mitigation unit 580 may be configured to perform one or more functions for mitigating (e.g., reducing or avoiding) one or more effects of a jamming signal on operation of the UE 500, e.g., accurate signal measurement (e.g., of a positioning signal, a communication signal, etc.). For example, the jamming mitigation unit 580 may be configured to inhibit use of signals within a frequency range determined to contain a jamming signal (e.g., by applying a notch filter and/or signal canceler).

One or more of the units 560, 570, 580 may comprise hardware and/or software of the processor 510. For example, the jamming mitigation unit 580 may comprise a digital notch filter implemented in software executed by hardware. As another example, the jamming mitigation unit 580 may comprise a digital notch filter implemented in hardware, with software controlling a center frequency and bandwidth of the notch filter. The processor 510 may comprise multiple separate components, e.g., multiple integrated circuit chips communicatively coupled to each other, e.g., by one or more interfaces.

Figure 7:
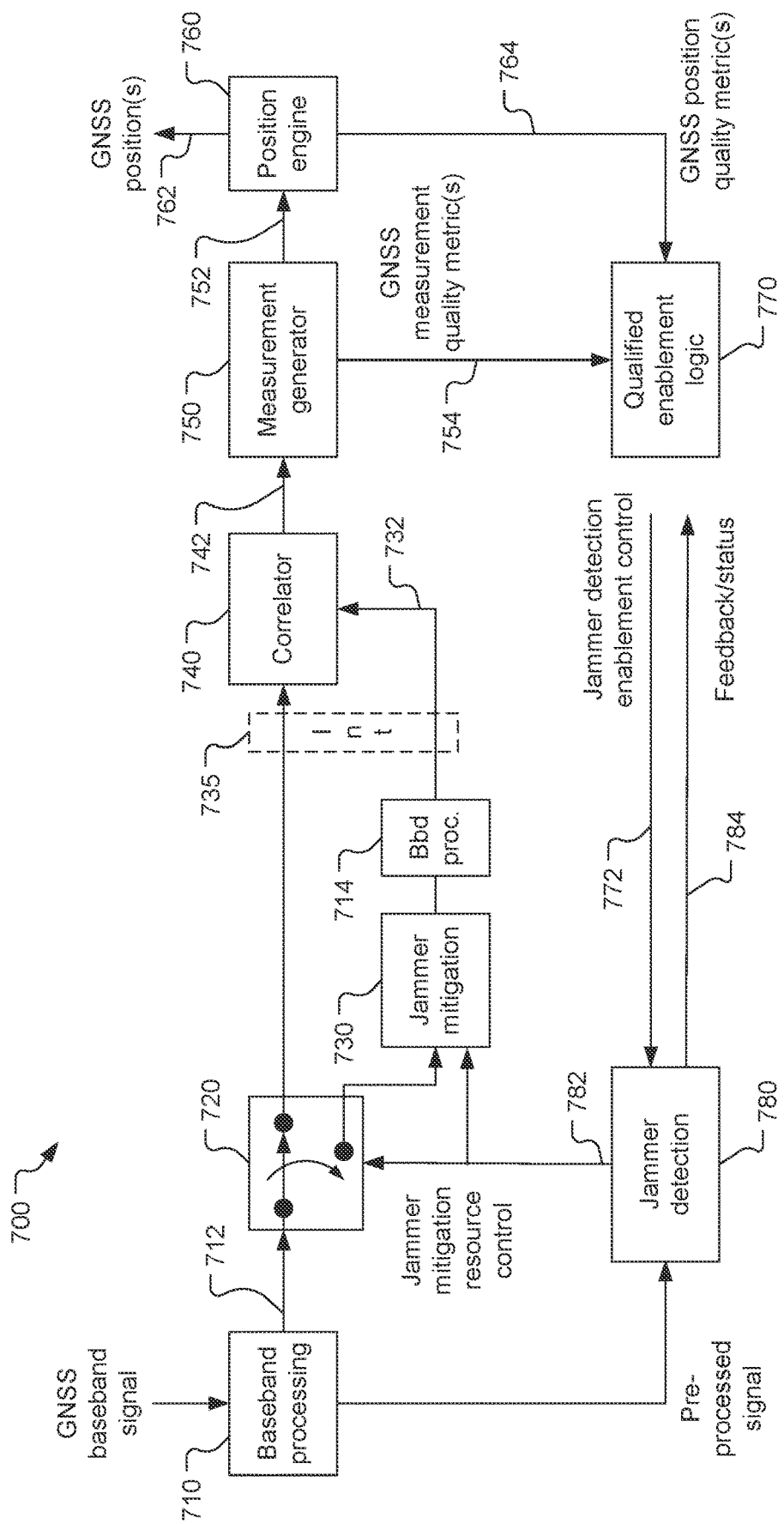
FIG. 7 is a block diagram of functional units for selective jamming detection and mitigation.

Referring also to FIG. 7, components of the processor 510 implement a jamming signal detection and mitigation system 700. The system 700 includes a baseband processing unit 710, a switch 720, a jammer mitigation unit 730 (which may be an example of the jamming mitigation unit 580), a supplemental baseband processing unit 714, a correlator 740, a measurement generator 750, a position engine 760, qualified enablement logic 770 (which may be an example of the jammer detection A/D unit 560), and a jammer detection unit 780 (which may be an example of the jamming signal detection unit 570). The jamming signal detection and mitigation system 700 may detect the presence of jammers, e.g., using specialized hardware, software, or a combination thereof. For example, the system 700 may implement a spectrum analysis technique to detect continuous wave (CW) jammers (jamming signals) using a combination of hardware and software. In response to detection of a jammer, the system 700 may deploy one or more mitigation resources, such as one or more jammer filters and/or one or more jammer cancelers, to remove or reduce an impact of the jammer. When a jammer technique is operational, the system 700 may consume more power compared to when the jammer technique is disabled. The system 700 may conserve power by limiting the time when one or more jammer detection techniques are operational, e.g., based on one or more of a variety of parameters such as one or more quality metrics and/or one or more other parameters as discussed herein. The system 700 may be disposed on, or be part of, one or more integrated circuit chips. For example, the baseband processing unit 710, the switch 720, the jammer mitigation unit 730, the supplemental baseband processing unit 714, and the jammer detection unit 780 may be disposed on one chip and the correlator 740, the measurement generator 750, the position engine 760, and the logic 770 may be disposed on another chip with a communication interface 735 connecting the chips.

Without jamming mitigation being implemented, GNSS signals may be received, correlated, measured, and further processed. The baseband processing unit 710 receives GNSS baseband signals, e.g., from one or more SVs via the interface 520 (e.g., via an antenna, a bandpass filter (BPF), a low-noise amplifier (LNA), a radio frequency/analog processing block (RFA), and an analog-to-digital converter (ADC)). The baseband processing unit 710 processes the received GNSS baseband signals for measurement and/or for use in detecting the presence of one or more jammers. The baseband processing unit 710 outputs pre-processed signals 712 to the switch 720 that, absent jammer mitigation, provides the pre-processed signals 712 to the correlator 740. The correlator 740 is configured to correlate the pre-processed signals 712 (or jammer-mitigated signals 732 if jammer mitigation is implemented) against one or more reference signals to determine correlation peaks. The correlator 740 is configured to output correlation information 742 (e.g., correlation peak parameters such as peak timing, peak width, etc.). The correlator 740 may be implemented primarily in hardware.

The measurement generator 750 is communicatively coupled to the correlator 740 to receive the correlation information 742 and configured to use the correlator information 742 to determine and provide GNSS measurements 752 to the position engine 760. The GNSS measurements 752 may include, for example, time of arrival of a GNSS signal, signal strength, Doppler frequency shift, carrier phase, etc.). The GNSS measurements 752 are measurement-level position information. The measurement generator 750 may be implemented in software.

The measurement generator 750 is further configured to determine and output one or more GNSS measurement quality metrics 754. For example, the measurement generator 750 may be configured to produce and output a quantity of qualified SV measurements that are available, code-carrier consistency, and/or one or more auto-correlation function checks. An SV measurement may be considered to be a qualified SV measurement based on one or more characteristics of a received SV signal and/or of the SV from which the SV signal is received. For example, a characteristic of a qualified SV measurement is that the transmitting SV is more than 5° above the horizon relative to the UE 500. Another example characteristic may be that orbital parameters (e.g., ephemeris data) are available for the SV signal which enable the SV signal to be measured and used (e.g., to determine a position fix for the UE 500). Another example characteristic may be that the received signal strength of the SV signal is above a threshold signal strength. Also or alternatively, one or more other characteristics may be used to determine whether an SV measurement is a qualified SV measurement. Code-carrier consistency is a measure of consistency between a change in pseudorange over multiple SV signal measurements and a speed of the UE 500 as determined by one or more Doppler SV signal measurements. An inconsistency exceeding a threshold inconsistency is indicative of a false peak being tracked (e.g., a jammed SV signal being measured). If measurement of an SV signal results in an inconsistency exceeding a threshold (e.g., a threshold that is a function of pseudorange and Doppler measurement uncertainties (which are a function of signal level); an example threshold may be 50 m/s), then the SV signal may be considered to be a failure. An auto-correlation function check could be a determination as to whether an auto-correlation peak is wider than a threshold width (e.g., a width of the peak at 3 dB down from the apex of the peak exceeds a threshold timespan). Another example auto-correlation function check could be a determination that multiple peaks are present for the same SV signal. An auto-correlation with an excessively-wide peak or with multiple peaks may be considered a failed auto-correlation. Another example auto-correlation function check could be a determination that a peak is above a detectability threshold and below a jammer ratio (a signal weakness threshold above noise in an energy grid (a correlation function in both time and frequency domains)). The position engine 760 may be implemented in software.

The position engine 760 is communicatively coupled to the measurement generator 750 to receive the GNSS measurements 752 and is configured to use the GNSS measurements 752 to determine position information, such as one or more GNSS positions 762, and one or more GNSS position quality metrics 764. The position information is position-level position information such as ranges from the UE 500 to SVs and the one or more GNSS positions 762 (i.e., location estimates for the UE 500). The position engine can output the GNSS position(s) 762, e.g., for applications that use the location of the UE 500. The GNSS position quality metric(s) 764 include one or more of a variety of metrics such as position uncertainty, dilution of precision, and post-fix SV range measurement residuals. The position uncertainty provides a measure of the quality (e.g., accuracy) of a position fix (location estimate) for the UE 500. If the position uncertainty is too high (e.g., 5 m), then the UE 500 may be in a challenging environment (i.e., an environment in which measuring SV signals is difficult and/or in which the ability of the UE 500 to measure SV signal accurately may be more affected by jamming than in other environments) and/or is being jammed (is in the presence of one or more jamming signals). The dilution of precision is based on the geometry of the SVs from which qualified SV measurements are available. The dilution of precision is affected by how diverse the geometry is of SVs from which qualified SV measurements are available. If the SVs are in diverse locations across the sky, the dilution of precision is better, and if SVs are bunched or grouped in a region of the sky, the dilution of precision is worse. The post-fix SV range measurement residuals are indicative of how well SV signal measurements fit with a position fix that has been computed. With jamming and/or multi-path, a characteristic (e.g., an average) of these residuals may exceed a threshold (e.g., 40 m) of acceptable deviation from the position fix.

The qualified enablement logic 770 (e.g., a portion of the jammer detection A/D unit 560) is communicatively coupled to the measurement generator 750 and the position engine 760 and configured to determine (e.g., if the jammer detection unit 780 is presently inactive) whether to activate the jammer detection unit 780 (to activate one or more jammer detection techniques). The logic 770 may determine whether to activate the jammer detection unit 780 based on one or more measurement-level metrics and/or one or more position-level metrics. For example, the logic 770 may activate the jammer detection unit 780 based on (e.g., in response to) a quantity of available qualified SV measurements being below a threshold quantity such as four, or five, or six (or another quantity). As another example, the logic 770 may activate the jammer detection unit 780 based on a dilution of precision (DOP) being above a threshold quantity such as five. As another example, the logic 770 may activate the jammer detection unit 780 based on the position uncertainty being above a threshold such as 5 m. As another example, the logic 770 may activate the jammer detection unit 780 based on a characteristic (e.g., an average, a square root of an average of squares, a maximum, or a geometric mean) of the post-fix SV range measurement residuals exceeding a threshold value (e.g., 40 m). As another example, the logic 770 may activate the jammer detection unit 780 based on a rate of signals that result in code-carrier consistency failure, e.g., more than N failures in a window of M seconds (e.g., more than five failures in a 20-second interval). As another example, the logic 770 may activate the jammer detection unit 780 based on one or more auto-correlation function check failures, e.g., a rate of auto-correlation function check failures exceeding a threshold (e.g., more than 1% of auto-correlation function checks failing, e.g., over a time interval). The logic 770 may activate the jammer detection unit 780 based on a combination of metrics, e.g., DOP and position uncertainty. If multiple metrics are used, one or more thresholds may be used that are different (e.g., more lenient) than the threshold(s) used for a determination to activate the jammer detection unit 780 based on a single metric. For example, a DOP threshold may be five for individual-metric-based determination to activate the jammer detection unit 780 and a position uncertainty threshold may be 5 m for individual-metric-based determination to activate the jammer detection unit 780, but the DOP threshold and/or the position uncertainty threshold may be different (e.g., lower) if the determination whether to activate the jammer detection unit 780 is based on both the DOP and the position uncertainty. The logic 770 may activate the jammer detection unit 780 by transmitting a jammer detection enablement control signal 772 indicating to activate the jammer detection unit 780. The logic 770 may be implemented in software.

The qualified enablement logic 770 and/or the jammer detection unit 780 (e.g., a portion of the jammer detection unit 780 that is a portion of the jammer detection A/D unit 560) are configured to determine (e.g., if the jammer detection unit 780 is presently active) whether to deactivate the jammer detection unit 780 (to deactivate one or more jammer detection techniques). For example, the logic 770 and/or the jammer detection unit 780 may deactivate the jammer detection unit 780 based on (e.g., in response to) a time or time interval passing after activation of the jammer detection unit 780. For example, in response to activating the jammer detection unit 780, the logic 770 or the jammer detection unit 780 may specify a future time or start a time for a specified time interval and when the future time passes or when the timer expires (after passage of the specified time interval), then the logic 770 or the jammer detection unit 780 may deactivate the jammer detection unit 780. Thus, the jammer detection unit 780 may be activated for a fixed amount of time before being deactivated. As another example, the jammer detection unit 780 may deactivate the jammer detection unit 780 based on a jamming signal being detected by one or more initial or preliminary detection stages (or phases) of the jammer detection unit 780, as indicated by the jammer detection unit 780 to the logic 770 in a feedback/status signal 784. For example, the jammer detection unit 780 may be configured to perform a "fast" scan (a "shallow" scan) and a "slow" scan (a "deep" scan). The fast scan can be performed quickly, with less power consumption than the slow scan, and can detect strong jamming signals whereas the slow scan can detect weaker jamming signals than the fast scan can. The jammer detection unit 780 may be configured to deactivate the jammer detection unit 780 based on the fast scan detecting a jamming signal, without performing the slow scan and thus avoiding power consumption for the slow scan. If the fast scan fails to detect a jamming signal, then the jammer detection unit 780 may perform the slow scan. As another example of jammer detection deactivation, the jammer detection unit 780 may deactivate the jammer detection unit 780 based on a final detection stage completing as indicated by the feedback/status signal 784. For example, with the jammer detection unit 780 configured to perform the fast scan and then the slow scan (e.g., if the fast scan failed to detect a jamming signal), the jammer detection unit 780 may deactivate the jammer detection unit 780 based on the slow scan being completed (with or without detecting a jamming signal). As another example of jammer detection deactivation, the logic 770 may deactivate the jammer detection unit 780 based on all analyzed GNSS quality metrics being satisfactory (i.e., none of the analyzed GNSS quality metrics failing) and thus not being indicative of jamming. As another example, the jammer detection unit 780 may be deactivated based on a combination of two or more of the techniques/factors discussed, e.g., based on a time interval passing and no jamming signal yet having been detected. Deactivating the jammer detection unit 780 may save power by avoiding using power that would be used for jammer detection (e.g., when unnecessary). The logic 770 may activate the jammer detection unit 780 by transmitting a jammer detection enablement control signal 772 indicating to deactivate the jammer detection unit 780.

The activating and deactivating of the jammer detection unit 780 may be repeated. For example, once the logic 770 activates the jammer detection unit 780, the logic 770 and/or the jammer detection unit 780 may determine whether to deactivate the jammer detection unit 780.

Once the jammer detection unit 780 is deactivated, the logic 770 may again determine whether to activate the jammer detection unit 780, and this cycle may be repeated.

The jammer detection unit 780, which is an example of the jamming signal detection unit 570, is configured to determine whether one or more jamming signals are being received by the UE 500. For example, the jammer detection unit 780 may be configured with a spectrum analyzer that can detect sine wave or continuous wave jamming signals. Also or alternatively, the jammer detection unit 780 may be configured to process one or more signal-strength metrics to determine whether a corresponding signal is a jamming signal. The jammer detection unit 780 may be configured to measure a variation of the signal-strength metric(s), produce one or more variation metrics, and determine whether a signal corresponding to the signal-strength metric(s) and the variation metric(s) is a jamming signal. The jammer detection unit 780 is configured to send a jammer mitigation resource control signal 782 to the switch 720 and the jammer mitigation unit 730. The signal 782 causes the switch 720 to convey the pre-processed signals 712 to the correlator 740 based on (e.g., in response to) absence of detection of a jamming signal and to convey the pre-processed signals 712 to the jammer mitigation unit 730 based on detection of a jamming signal. The jammer detection unit 780 may be implemented by a combination of hardware and software. For example, hardware may be used to perform Fourier Transforms (e.g., Fast Fourier Transforms) on signals. If the jammer detection unit 780 contains a spectrum analyzer, while spectral information is gathered (while the jammer detection unit 780 is active), the interface 735 (if present) may be operated in a full-power mode, and the interface 735 may be operated in a lower-power mode while the jammer detection unit 780 is deactivated, thus saving power while the jammer detection unit 780 is inactive.

The jammer mitigation unit 730, e.g., which is an example of the jamming mitigation unit 580, is configured to reduce or eliminate the impact of jamming signals on the measurement generator 750 and/or the position engine 760. For example, the jammer mitigation unit 730 may include one or more notch filters than can be adjusted to inhibit or block the frequency(ies) of the detected jamming signal(s). Also or alternatively, the jammer mitigation unit 730 may implement one or more other techniques to mitigate the effect(s) of one or more detected jamming signals. The jammer mitigation unit 730 outputs the jammer-mitigated signals 732, which may be the result of further baseband processing (i.e., in addition to processing by the baseband processing unit 710) provided by the supplemental baseband processing unit 714 (if present). The jammer mitigation unit 730 may be disposed at various places in the signal processing chain, and thus baseband processing by the supplemental baseband processing unit 714 may be applied to the output of the jammer mitigation unit 730.

By implementing techniques discussed herein, jammer detection may be selectively employed, reducing power consumption compared to employing jammer detection continuously, e.g., regardless of likely presence or absence of a jammer. For example, if the UE 500 receives unjammed SV signals, jammer detection may be disabled, avoiding power consumption for jammer detection. If a jammer is introduced, then the jammer detection unit 750 may be activated in response to one or more quality metrics degrading, with the jammer detection unit 750 using some power to attempt to detect a jamming signal, causing power consumption by the UE 500 to increase. In response to a jamming signal being detected, the jammer mitigation unit 730 may be activated and the switch 720 controlled to direct received signals through the jammer mitigation unit 730 to reduce or eliminate negative effects of the jamming signal. Consequently, quality of position information based on one or more SV signal measurements may remain high despite the presence of the jamming signal. The jammer detection unit 780 may be deactivated (e.g., in response to the jamming signal no longer being detected, in response to passage of a time, or a combination thereof (e.g., passage of the time and the jamming signal no longer being detected), etc.), which reduces power consumption of the UE 500. As another example, if an SV signal measurement anomaly and/or a position anomaly (e.g., a code-carrier inconsistency) is introduced, then the jammer detection unit 780 may be activated in response to the anomaly(ies). The jammer mitigation unit 730 may be activated if a jamming signal is detected. The jammer detection unit 780 may be deactivated to reduce power consumption (e.g., after passage of time and/or in response to the anomaly no longer being detected).

Figure 8:
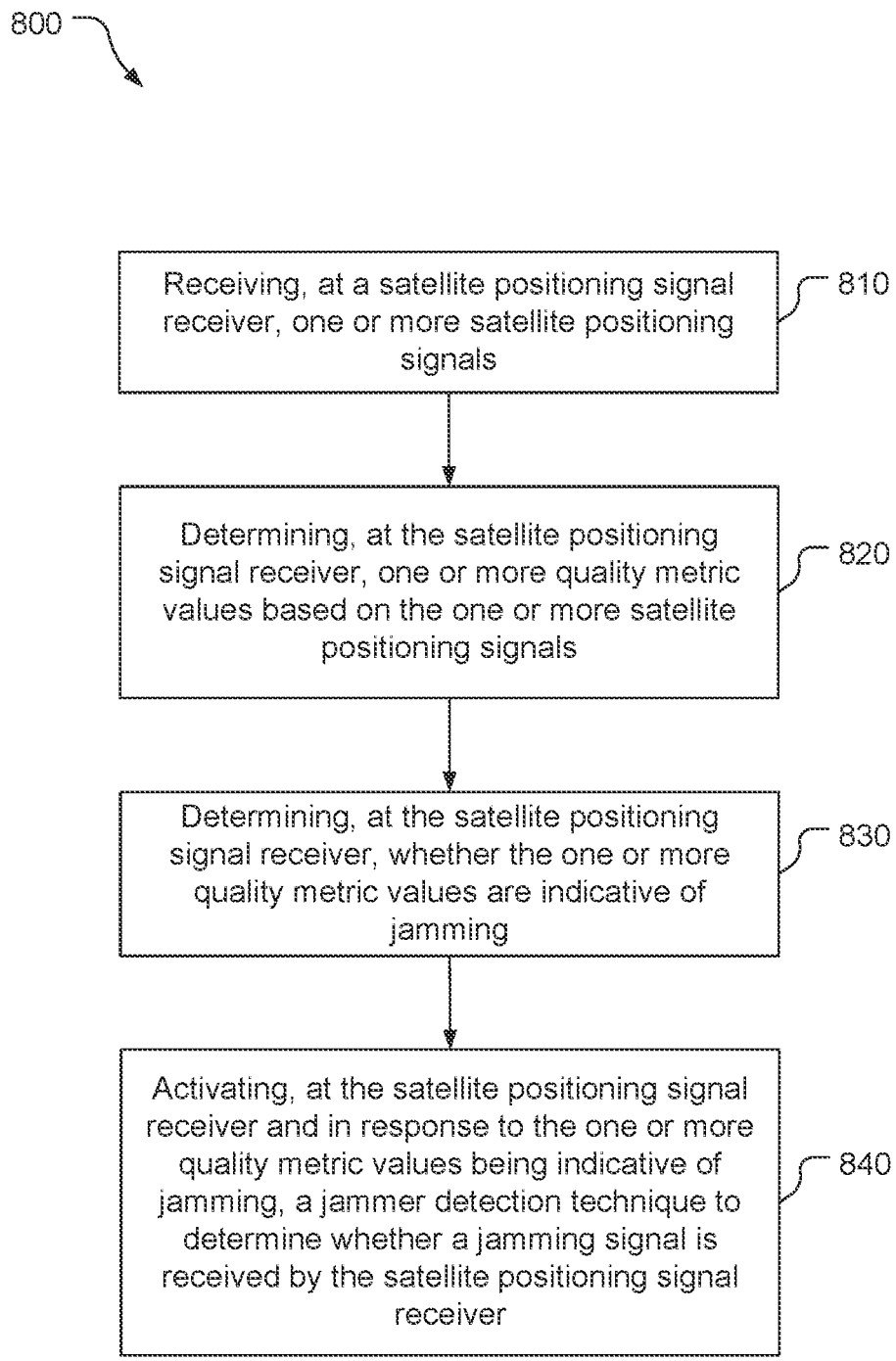
FIG. 8 is a block diagram of a jamming signal detection control method.

Referring to FIG. 8, with further reference to FIGS. 1-7, a jamming signal detection control method 800 includes the stages shown. The method 800 is, however, an example and not limiting. The method 800 may be altered, e.g., by having stages added, removed, rearranged, combined, performed concurrently, and/or having single stages split into multiple stages.

At stage 810, the method 800 includes receiving, at a satellite positioning signal receiver, one or more satellite positioning signals. For example, the UE 500 receives one or more SV signals via the interface 520 (e.g., the antenna 262) with each of the SV signal(s) being coded in order to determine a time of arrival of the SV signal through correlation. The interface 520 (possibly in combination with the processor 510 and possibly the memory 530) may comprise means for receiving the one or more satellite positioning signals.

At stage 820, the method 800 includes determining, at the satellite positioning signal receiver, one or more quality metric values based on the one or more satellite positioning signals. For example, the measurement generator 750 may determine one or more values of one or more measurement quality metrics based on the received SV signal(s). As another example, the position engine 760 may process one or more measurements of the SV signal(s) to determine one or more values of one or more position quality metrics that is(are) one or more processed-measurement values, e.g., one or more ranges, one or more location estimates, etc. One or more of the measurement quality metrics and/or one or more of the position quality metrics may be used further, e.g., as discussed with respect to stage 830. The processor 510, possibly in combination with the memory 530, may comprise means for determining position information.

At stage 830, the method 800 includes determining, at the satellite positioning signal receiver, whether the one or more quality metric values are indicative of jamming. For example, the qualified enablement logic 770 determines whether any of the GNSS measurement quality metric(s) 754 is indicative of jamming, or whether a combination of two or more of the GNSS measurement quality metric(s) 754 are indicative of jamming, or whether any of the GNSS position quality metric(s) 764 is indicative of jamming, or whether a combination of two or more of the GNSS position quality metric(s) 764 are indicative of jamming, or whether one or more of the GNSS measurement quality metric(s) 754 and one or more of the GNSS position quality metric(s) 764 are indicative of jamming, e.g., as discussed above. The processor 510, possibly in combination with the memory 530, may comprise means for determining whether the one or more quality metric values are indicative of jamming.

At stage 840, the method 800 includes activating, at the satellite positioning signal receiver and in response to the one or more quality metric values being indicative of jamming, a jammer detection technique to determine whether a jamming signal is received by the satellite positioning signal receiver. For example, the qualified enablement logic 770 transmits the jammer detection enablement control signal 772 to the jammer detection unit 780 to activate one or more jammer detection techniques (e.g., spectrum analysis) for detecting one or more jamming signals. The jammer detection unit 780 implements one or more techniques to attempt to detect any jamming signals received by the UE 500. The processor 510, possibly in combination with the memory 530, possibly in combination with the interface 520 (e.g., the antenna 262 and the SPS receiver 217) may comprise means for activating the jammer detection technique.

Implementations of the method 800 may include one or more of the following features. In an example implementation, the method 800 includes deactivating the jammer detection technique in response to completion of jammer detection. For example, the qualified enablement logic 770 transmits the jammer detection enablement control signal 772 to the jammer detection unit 780 to deactivate the one or more jammer detection techniques based on completion of the jammer detection technique. Determining that jammer detection completion has occurred may comprise determining that: a threshold time has passed since activation of the jammer detection technique; or the jamming signal has been detected by the jammer detection technique; or all analysis of the jammer detection technique has been performed; or all of the one or more quality metric values being satisfactory; or any combination of two or more thereof. For example, the logic 770 may deactivate the jammer detection unit 780 based on a time interval passing or a specified time passing, or a jamming signal being successfully detected, or the jammer detection technique(s) being exhausted without detection of a jamming signal, or the quality metric value(s) being satisfactory and thus not indicative of jamming, or a combination of any two or more of these considerations.

Also or alternatively, implementations of the method 800 may include one or more of the following features. In an example implementation, determining whether the one or more quality metric values are indicative of jamming comprises: determining whether a threshold number of satellite vehicle measurements are available; or determining whether a dilution of precision is less than a threshold dilution of precision; or determining whether a position uncertainty is less than a threshold position uncertainty; or determining whether an average of post-fix satellite vehicle range measurement residuals exceeds a residual threshold; or determining whether the one or more quality metric values are indicative of an inconsistency between a speed of the satellite positioning signal receiver and a change in range between the satellite positioning signal receiver and a satellite vehicle; or determining whether an autocorrelation peak exceeds a threshold peak width, or the one or more quality metric values comprise an unacceptable amount of autocorrelation peaks below a threshold strength, or a combination thereof; or determining any combination of two or more thereof. For example, the logic 770 may determine to activate the jammer detection unit 780 based on fewer than a threshold amount of qualified SV measurements being available, or poor dilution of precision, or high position uncertainty, or high post-fix (after a position fix) SV range measurement residuals, or inconsistent change of range from the UE 500 to an SV vs. speed of the UE 500, or an undesirably-wide autocorrelation peak or an unacceptable amount of detected but weak autocorrelation peaks, or a combination of any two or more of these considerations.

Also or alternatively, implementations of the method 800 may include one or more of the following features. In an example implementation, the method 800 includes implementing a jammer mitigation technique in response to the jammer detection technique determining that the jamming signal is received by the satellite positioning signal receiver. For example, the jammer detection unit 780 may transmit the jammer mitigation resource control signal 782 to the jammer mitigation unit 730 to activate the jammer mitigation unit 730 and to the switch 720 to direct incoming signals to the jammer mitigation unit 730. The jammer mitigation unit 730 may suppress (e.g., filter) one or more detected jamming signals to help ensure high-quality SV signal measurement and avoid false measurements. The jammer mitigation unit 730 (e.g., the processor 510, possibly the memory 530, and the interface 520 (e.g., a notch filter)) may comprise means for implementing a jammer mitigation technique. In another example implementation, the one or more quality metric values comprise at least one satellite positioning signal measurement. For example, the one or more quality metric values may include one or more of the GNSS measurement quality metric(s) 754. In another example implementation, the one or more quality metric values comprise at least one position quality metric value. For example, the one or more quality metric values may include one or more of the GNSS position quality metric(s) 764, which may include a range and/or a location estimate.

IMPLEMENTATION EXAMPLES

Implementation examples are provided in the following numbered clauses.

Clause 1. An apparatus comprising:
a receiver configured to receive satellite positioning signals,
a memory; and
a processor, communicatively coupled to the receiver and the memory, configured to:
determine one or more quality metric values based on one or more of the satellite positioning signals;
determine whether the one or more quality metric values are indicative of jamming; and
activate, in response to the one or more quality metric values being indicative of jamming, a jammer detection technique to determine whether a jamming signal is received by the receiver.

Clause 2. The apparatus of clause 1, wherein the processor is configured to deactivate the jammer detection technique in response to completion of jammer detection.

Clause 3. The apparatus of clause 2, wherein the processor is configured to determine that jammer detection completion has occurred by determining that:
a threshold time has passed since activation of the jammer detection technique; or
the jamming signal has been detected by the jammer detection technique; or
all analysis of the jammer detection technique has been performed; or
all of the one or more quality metric values being satisfactory; or
any combination of two or more thereof.

Clause 4. The apparatus of clause 1, wherein to determine whether the one or more quality metric values are indicative of jamming the processor is:
configured to determine whether a threshold number of satellite vehicle measurements are available; or
configured to determine whether a dilution of precision is less than a threshold dilution of precision; or
configured to determine whether a position uncertainty is less than a threshold position uncertainty; or
configured to determine whether an average of post-fix satellite vehicle range measurement residuals exceeds a residual threshold; or
configured to determine whether the one or more quality metric values are indicative of an inconsistency between a speed of the apparatus and a change in range between the apparatus and a satellite vehicle; or
configured to determine whether an autocorrelation peak exceeds a threshold peak width, or the one or more quality metric values comprise an unacceptable amount of autocorrelation peaks below a threshold strength, or a combination thereof; or
configured in accordance with a combination of two or more thereof.

Clause 5. The apparatus of clause 1, wherein the processor is configured to implement a jammer mitigation technique in response to the jammer detection technique determining that the jamming signal is received by the receiver.

Clause 6. The apparatus of clause 1, wherein the one or more quality metric values comprise at least one satellite positioning signal measurement.

Clause 7. The apparatus of clause 1, wherein the one or more quality metric values comprise at least one position quality metric value.

Clause 8. The apparatus of clause 7, wherein the at least one position quality metric value comprises a range.

Clause 9. The apparatus of clause 7, wherein the at least one position quality metric value comprises a location estimate.

Clause 10. A jamming signal detection control method comprising:
receiving, at a satellite positioning signal receiver, one or more satellite positioning signals.
determining, at the satellite positioning signal receiver, one or more quality metric values based on the one or more satellite positioning signals;
determining, at the satellite positioning signal receiver, whether the one or more quality metric values are indicative of jamming; and
activating, at the satellite positioning signal receiver and in response to the one or more quality metric values being indicative of jamming, a jammer detection technique to determine whether a jamming signal is received by the satellite positioning signal receiver.

Clause 11. The jamming signal detection control method of clause 10, further comprising deactivating the jammer detection technique in response to completion of jammer detection.

Clause 12. The jamming signal detection control method of clause 11, wherein determining that jammer detection completion has occurred comprises determining that:
a threshold time has passed since activation of the jammer detection technique; or
the jamming signal has been detected by the jammer detection technique; or
all analysis of the jammer detection technique has been performed; or
all of the one or more quality metric values being satisfactory; or
any combination of two or more thereof.

Clause 13. The jamming signal detection control method of clause 10, wherein determining whether the one or more quality metric values are indicative of jamming comprises:
determining whether a threshold number of satellite vehicle measurements are available; or
determining whether a dilution of precision is less than a threshold dilution of precision; or
determining whether a position uncertainty is less than a threshold position uncertainty; or
determining whether an average of post-fix satellite vehicle range measurement residuals exceeds a residual threshold; or
determining whether the one or more quality metric values are indicative of an inconsistency between a speed of the satellite positioning signal receiver and a change in range between the satellite positioning signal receiver and a satellite vehicle; or
determining whether an autocorrelation peak exceeds a threshold peak width, or the one or more quality metric values comprise an unacceptable amount of autocorrelation peaks below a threshold strength, or a combination thereof; or determining any combination of two or more thereof.

Clause 14. The jamming signal detection control method of clause 10, further comprising implementing a jammer mitigation technique in response to the jammer detection technique determining that the jamming signal is received by the satellite positioning signal receiver.

Clause 15. The jamming signal detection control method of clause 10, wherein the one or more quality metric values comprise at least one satellite positioning signal measurement.

Clause 16. The jamming signal detection control method of clause 10, wherein the one or more quality metric values comprise at least one position quality metric value.

Clause 17. The jamming signal detection control method of clause 16, wherein the at least one position quality metric value comprises a range.

Clause 18. The jamming signal detection control method of clause 16, wherein the at least one position quality metric value comprises a location estimate.

Clause 19. An apparatus comprising:
 means for receiving one or more satellite positioning signals:
 means for determining one or more quality metric values based on the one or more satellite positioning signals;
 means for determining whether the one or more quality metric values are indicative of jamming; and
 means for activating, in response to the one or more quality metric values being indicative of jamming, jammer detection means for determining whether a jamming signal is received by the apparatus.

Clause 20. The apparatus of clause 19, further comprising means for deactivating the jammer detection means in response to completion of jammer detection.

Clause 21. The apparatus of clause 20, wherein the means for deactivating the jammer detection means are for determining that jammer detection completion has occurred by determining that:
 a threshold time has passed since activation of the jammer detection means; or
 the jamming signal has been detected by the jammer detection means; or
 all analysis of the jammer detection means has been performed; or
 all of the one or more quality metric values being satisfactory; or
 any combination of two or more thereof.

Clause 22. The apparatus of clause 19, wherein the means for determining whether the one or more quality metric values are indicative of jamming comprise:
 means for determining whether a threshold number of satellite vehicle measurements are available; or
 means for determining whether a dilution of precision is less than a threshold dilution of precision; or
 means for determining whether a position uncertainty is less than a threshold position uncertainty; or
 means for determining whether an average of post-fix satellite vehicle range measurement residuals exceeds a residual threshold; or
 means for determining whether the one or more quality metric values are indicative of an inconsistency between a speed of the apparatus and a change in range between the apparatus and a satellite vehicle; or
 means for determining whether an autocorrelation peak exceeds a threshold peak width, or the one or more quality metric values comprise an unacceptable amount of autocorrelation peaks below a threshold strength, or a combination thereof; or
 any combination of two or more thereof.

Clause 23. The apparatus of clause 19, further comprising means for mitigating jamming in response to the means for determining whether the jamming signal is received by the apparatus determining that the jamming signal is received by the apparatus.

Clause 24. The apparatus of clause 19, wherein the one or more quality metric values comprise at least one satellite positioning signal measurement.

Clause 25. The apparatus of clause 19, wherein the one or more quality metric values comprise at least one position quality metric value.

Clause 26. The apparatus of clause 25, wherein the at least one position quality metric value comprises a range.

Clause 27. The apparatus of clause 25, wherein the at least one position quality metric value comprises a location estimate.

Clause 28. A non-transitory, processor-readable storage medium comprising processor-readable instructions to cause a processor of an apparatus to:
 receive one or more satellite positioning signals;
 determine one or more quality metric values based on the one or more satellite positioning signals;
 determine whether the one or more quality metric values are indicative of jamming; and
 activate, in response to the one or more quality metric values being indicative of jamming, a jammer detection technique to determine whether a jamming signal is received by the apparatus.

Clause 29. The non-transitory, processor-readable storage medium of clause 28, further comprising processor-readable instructions to cause the processor to deactivate the jammer detection technique in response to completion of jammer detection.

Clause 30. The non-transitory, processor-readable storage medium of clause 29, wherein the processor-readable instructions to cause the processor to deactivate the jammer detection technique comprise processor-readable instructions to cause the processor to determine that jammer detection completion has occurred by determining that:
 a threshold time has passed since activation of the jammer detection technique; or
 the jamming signal has been detected by the jammer detection technique; or
 all analysis of the jammer detection technique has been performed; or
 all of the one or more quality metric values being satisfactory; or
 any combination of two or more thereof.

Clause 31. The non-transitory, processor-readable storage medium of clause 28, wherein the processor-readable instructions to cause the processor to determine whether the one or more quality metric values are indicative of jamming comprise:
 processor-readable instructions to cause the processor to determine whether a threshold number of satellite vehicle measurements are available; or
 processor-readable instructions to cause the processor to determine whether a dilution of precision is less than a threshold dilution of precision; or
 processor-readable instructions to cause the processor to determine whether a position uncertainty is less than a threshold position uncertainty; or processor-readable instructions to cause the processor to determine whether an average of post-fix satellite vehicle range measurement residuals exceeds a residual threshold; or processor-readable instructions to cause the processor to determine whether the one or more quality metric values are indicative of an inconsistency between a speed of the apparatus and a change in range between the apparatus and a satellite vehicle; or processor-readable instructions to cause the processor to determine whether an autocorrelation peak exceeds a threshold peak width, or the one or more quality metric values comprise an unacceptable amount of autocorrelation peaks below a threshold strength, or a combination thereof; or any combination of two or more thereof.

Clause 32. The non-transitory, processor-readable storage medium of clause 28, further comprising processor-readable instructions to cause the processor to mitigate jamming in response to the processor-readable instructions to cause the processor to determine whether the jamming signal is received by the apparatus determining that the jamming signal is received by the apparatus.

Clause 33. The non-transitory, processor-readable storage medium of clause 28, wherein the one or more quality metric values comprise at least one satellite positioning signal measurement.

Clause 34. The non-transitory, processor-readable storage medium of clause 28, wherein the one or more quality metric values comprise at least one position quality metric value.

Clause 35. The non-transitory, processor-readable storage medium of clause 34, wherein the at least one position quality metric value comprises a range.

Clause 36. The non-transitory, processor-readable storage medium of clause 34, wherein the at least one position quality metric value comprises a location estimate.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A. or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
   a receiver configured to receive satellite positioning signals;
   a memory; and
   a processor, communicatively coupled to the receiver and the memory, configured to:
     determine one or more quality metric values based on one or more of the satellite positioning signals;
     determine whether the one or more quality metric values are indicative of jamming;
     activate, in response to the one or more quality metric values being indicative of jamming, a jammer detection technique to determine whether a jamming signal is received by the receiver; and
     deactivate the jammer detection technique in response to completion of jammer detection.

2. The apparatus of claim 1, wherein the processor is configured to determine that jammer detection completion has occurred by determining that:
   a threshold time has passed since activation of the jammer detection technique; or
   the jamming signal has been detected by the jammer detection technique; or
   all analysis of the jammer detection technique has been performed; or
   all of the one or more quality metric values being satisfactory; or
   any combination of two or more thereof.

3. The apparatus of claim 1, wherein to determine whether the one or more quality metric values are indicative of jamming the processor is:
   configured to determine whether a threshold number of satellite vehicle measurements are available; or
   configured to determine whether a dilution of precision is less than a threshold dilution of precision; or
   configured to determine whether a position uncertainty is less than a threshold position uncertainty; or
   configured to determine whether an average of post-fix satellite vehicle range measurement residuals exceeds a residual threshold; or
   configured to determine whether the one or more quality metric values are indicative of an inconsistency between a speed of the apparatus and a change in range between the apparatus and a satellite vehicle; or
   configured to determine whether an autocorrelation peak exceeds a threshold peak width, or the one or more quality metric values comprise an unacceptable amount of autocorrelation peaks below a threshold strength, or a combination thereof; or
   configured in accordance with a combination of two or more thereof.

4. The apparatus of claim 1, wherein the processor is configured to implement a jammer mitigation technique in response to the jammer detection technique determining that the jamming signal is received by the receiver.

5. The apparatus of claim 1, wherein the one or more quality metric values comprise at least one satellite positioning signal measurement.

6. The apparatus of claim 1, wherein the one or more quality metric values comprise at least one position quality metric value.

7. The apparatus of claim 6, wherein the at least one position quality metric value comprises a range.

8. The apparatus of claim 6, wherein the at least one position quality metric value comprises a location estimate.

9. A jamming signal detection control method comprising:
receiving, at a satellite positioning signal receiver, one or more satellite positioning signals;
determining, at the satellite positioning signal receiver, one or more quality metric values based on the one or more satellite positioning signals;
determining, at the satellite positioning signal receiver, whether the one or more quality metric values are indicative of jamming;
activating, at the satellite positioning signal receiver and in response to the one or more quality metric values being indicative of jamming, a jammer detection technique to determine whether a jamming signal is received by the satellite positioning signal receiver; and
deactivating the jammer detection technique in response to completion of jammer detection.

10. The jamming signal detection control method of claim 9, wherein determining that jammer detection completion has occurred comprises determining that:
a threshold time has passed since activation of the jammer detection technique; or
the jamming signal has been detected by the jammer detection technique; or
all analysis of the jammer detection technique has been performed; or
all of the one or more quality metric values being satisfactory; or
any combination of two or more thereof.

11. The jamming signal detection control method of claim 9, wherein determining whether the one or more quality metric values are indicative of jamming comprises:
determining whether a threshold number of satellite vehicle measurements are available; or
determining whether a dilution of precision is less than a threshold dilution of precision; or
determining whether a position uncertainty is less than a threshold position uncertainty; or
determining whether an average of post-fix satellite vehicle range measurement residuals exceeds a residual threshold; or
determining whether the one or more quality metric values are indicative of an inconsistency between a speed of the satellite positioning signal receiver and a change in range between the satellite positioning signal receiver and a satellite vehicle; or
determining whether an autocorrelation peak exceeds a threshold peak width, or the one or more quality metric values comprise an unacceptable amount of autocorrelation peaks below a threshold strength, or a combination thereof; or
determining any combination of two or more thereof.

12. The jamming signal detection control method of claim 9, further comprising implementing a jammer mitigation technique in response to the jammer detection technique determining that the jamming signal is received by the satellite positioning signal receiver.

13. The jamming signal detection control method of claim 9, wherein the one or more quality metric values comprise at least one satellite positioning signal measurement.

14. The jamming signal detection control method of claim 9, wherein the one or more quality metric values comprise at least one position quality metric value.

15. The jamming signal detection control method of claim 14, wherein the at least one position quality metric value comprises a range.

16. The jamming signal detection control method of claim 14, wherein the at least one position quality metric value comprises a location estimate.

17. An apparatus comprising:
means for receiving one or more satellite positioning signals;
means for determining one or more quality metric values based on the one or more satellite positioning signals;
means for determining whether the one or more quality metric values are indicative of jamming;
means for activating, in response to the one or more quality metric values being indicative of jamming, jammer detection means for determining whether a jamming signal is received by the apparatus; and
means for deactivating the jammer detection means in response to completion of jammer detection.

18. The apparatus of claim 17, wherein the means for determining whether the one or more quality metric values are indicative of jamming comprise:
means for determining whether a threshold number of satellite vehicle measurements are available; or
means for determining whether a dilution of precision is less than a threshold dilution of precision; or
means for determining whether a position uncertainty is less than a threshold position uncertainty; or
means for determining whether an average of post-fix satellite vehicle range measurement residuals exceeds a residual threshold; or
means for determining whether the one or more quality metric values are indicative of an inconsistency between a speed of the apparatus and a change in range between the apparatus and a satellite vehicle; or
means for determining whether an autocorrelation peak exceeds a threshold peak width, or the one or more quality metric values comprise an unacceptable amount of autocorrelation peaks below a threshold strength, or a combination thereof; or
any combination of two or more thereof.

19. The apparatus of claim 17, further comprising means for mitigating jamming in response to the means for determining whether the jamming signal is received by the apparatus determining that the jamming signal is received by the apparatus.

20. The apparatus of claim 17, wherein the one or more quality metric values comprise at least one satellite positioning signal measurement.

21. The apparatus of claim 17, wherein the one or more quality metric values comprise at least one position quality metric value.

22. A non-transitory, processor-readable storage medium comprising processor-readable instructions to cause a processor of an apparatus to:
receive one or more satellite positioning signals;
determine one or more quality metric values based on the one or more satellite positioning signals;
determine whether the one or more quality metric values are indicative of jamming;
activate, in response to the one or more quality metric values being indicative of jamming, a jammer detection technique to determine whether a jamming signal is received by the apparatus; and
deactivate the jammer detection technique in response to completion of jammer detection.

23. The non-transitory, processor-readable storage medium of claim 22, wherein the processor-readable instructions to cause the processor to determine whether the one or more quality metric values are indicative of jamming comprise:

processor-readable instructions to cause the processor to determine whether a threshold number of satellite vehicle measurements are available; or processor-readable instructions to cause the processor to determine whether a dilution of precision is less than a threshold dilution of precision; or processor-readable instructions to cause the processor to determine whether a position uncertainty is less than a threshold position uncertainty; or processor-readable instructions to cause the processor to determine whether an average of post-fix satellite vehicle range measurement residuals exceeds a residual threshold; or processor-readable instructions to cause the processor to determine whether the one or more quality metric values are indicative of an inconsistency between a speed of the apparatus and a change in range between the apparatus and a satellite vehicle; or processor-readable instructions to cause the processor to determine whether an autocorrelation peak exceeds a threshold peak width, or the one or more quality metric values comprise an unacceptable amount of autocorrelation peaks below a threshold strength, or a combination thereof; or any combination of two or more thereof.

24. The non-transitory, processor-readable storage medium of claim 22, further comprising processor-readable instructions to cause the processor to mitigate jamming in response to the processor-readable instructions to cause the processor to determine whether the jamming signal is received by the apparatus determining that the jamming signal is received by the apparatus.

25. The non-transitory, processor-readable storage medium of claim 22, wherein the one or more quality metric values comprise at least one satellite positioning signal measurement.

26. The non-transitory, processor-readable storage medium of claim 22, wherein the one or more quality metric values comprise at least one position quality metric value.

* * * * *